(12) United States Patent
Kato et al.

(10) Patent No.: US 7,305,792 B2
(45) Date of Patent: Dec. 11, 2007

(54) TIP ROD

(75) Inventors: Yoshinao Kato, Kiyose (JP); Takenori Ohtsu, Higashikurume (JP); Hideyuki Naito, Higashimurayama (JP); Tetsuo Akutsu, Tokorozawa (JP); Katsuhiro Oikawa, Kodaira (JP); Hidenori Kosai, Niiza (JP)

(73) Assignee: Daiwa Seiko, Inc., Tokyo (JP)

( * ) Notice: Subject to any disclaimer, the term of this patent is extended or adjusted under 35 U.S.C. 154(b) by 180 days.

(21) Appl. No.: 11/045,497

(22) Filed: Jan. 31, 2005

(65) Prior Publication Data
US 2005/0178040 A1  Aug. 18, 2005

(30) Foreign Application Priority Data

Jan. 30, 2004 (JP) ............................. P2004-023085
Jan. 30, 2004 (JP) ............................. P2004-023086
Jan. 30, 2004 (JP) ............................. P2004-023087

(51) Int. Cl.
*A01K 87/00* (2006.01)
(52) U.S. Cl. .......................... 43/18.1 R; 43/185; 43/24
(58) Field of Classification Search ............ 43/18.1 R, 43/18.5, 24
See application file for complete search history.

(56) References Cited

U.S. PATENT DOCUMENTS

| 3,953,637 | A | * | 4/1976 | Phillips .................... 428/156 |
| 4,138,285 | A | * | 2/1979 | Michael .................... 156/161 |
| 4,468,270 | A | * | 8/1984 | Green ...................... 156/189 |
| 5,317,828 | A | * | 6/1994 | Yasui ....................... 43/18.5 |
| 6,108,959 | A | * | 8/2000 | Tsurufuji et al. .......... 43/18.1 R |
| 6,148,558 | A | * | 11/2000 | Ono et al. ................ 43/18.1 R |
| 6,334,272 | B1 | * | 1/2002 | Akiba et al. .................. 43/24 |
| 6,408,562 | B1 | * | 6/2002 | Sunaga et al. ................ 43/24 |
| 6,612,065 | B1 | * | 9/2003 | Blanchette et al. ............. 43/24 |
| 2002/0023380 | A1 | * | 2/2002 | Sunaga et al. ................ 43/24 |

FOREIGN PATENT DOCUMENTS

| JP | 03236732 A | * | 10/1991 |
| JP | 2001-37378 A | | 2/2001 |
| JP | 2001275520 A | * | 10/2001 |
| JP | 2002-233274 A | | 8/2002 |
| JP | 2004135626 A | * | 5/2004 |
| JP | 2006006230 A | * | 1/2006 |

* cited by examiner

Primary Examiner—Jill Gray
(74) Attorney, Agent, or Firm—Sughrue Mion, PLLC

(57) ABSTRACT

Where a super-elastic alloy is used as a core material, boundary separation can be prevented on substantial deflection. The super-elastic alloy is used as the core material, an outside layer made with fiber-reinforced resin is provided outside except the tip part region of the core material, and a resin-rich layer greater in resin ratio than the outside layer is provided between the outside layer and the core material so as to be adjacent to the core material.

12 Claims, 4 Drawing Sheets

TIP ROD

BACKGROUND OF THE INVENTION

The present invention relates to a tip rod in which a super-elastic alloy is used. Accordingly, the rod is applicable for a fishing rod, especially for "a fishing rod used in raft fishing" for catching black porgy and etc, and for a fishing rod for catching filefish and etc.

A fishing rod to be used in catching black porgy etc., on a raft is made short in length and light in weight. It is, for example, from 1.3 to 2.1 meters in entire length. It is also made particularly slender in the rod tip part so as to respond delicately. Tip rods to be used in raft fishing are manufactured on the premise that they are bent substantially. Patent document 1 listed below has disclosed a fishing rod provided with a layer of a fiber-reinforced resin made with a low-elastic material or a high elongation percentage material adjacent to a core material of a super-elastic alloy and also provided with a layer of a high-elastic and low-elongation percentage material outside said layer. Also disclosed is a fishing rod in which the elongation percentage is made approximate between a layer of a fiber-reinforced resin made with a low-elastic material or a high elongation material and a core material, thereby preventing boundary separation and making it possible to provide a substantial deflection for a long time.

However, super-elastic alloys are 3 to 8% in elongation, and glass fibers, a low-elastic material and also a high elongation percentage material, are 3.5 to 4% in elongation, thus making it difficult to approximate the elongation percentage. Even if the elongation percentage of the core material is made approximate to that of the adjacent layer, there is a difference in elongation between the adjacent layer and the outside layer, namely, a layer of high-elastic material (a layer of low-elongation percentage material). A tubular member tends to give an oval shape when the transverse section is deformed on the substantial bend of the rod, whereas a solid material will be difficult in giving an oval shape. It is, therefore, necessary to prevent boundary separation which may occur due to a difference in deformation characteristics between a core material and an outer body layer on the substantial bend, rather than approximation of the elongation percentage.

When a prepreg sheet or a tightening tape is made greater in tensile force for preventing inclusion of bubbles in manufacturing a particularly slender fishing rod such as a tip rod, the force may deflect fishing rod materials thus resulting in a problem of bent fishing rods. Further even if the deflection is not observed before the burning, deflection may occur due to internal stress during heating and burning. Deflected fishing rods are defective and result in a lower yield.

Further, the following patent document 2 has disclosed the structure of a fishing rod which is joined by screwing a solid tip rod made with a fiber-reinforced resin into a tubular rod body with the same material.

However, it is also possible as the structure of a fishing rod to manufacture only a tip part region by using a super-elastic alloy, to which a tubular body made of a fiber-reinforced resin is subsequently joined, thereby giving an entire fishing rod, in addition to the structure of a fishing rod, in which an entire length is made with a super-elastic alloy. In this connection, where a fiber-reinforced resin part is directly provided with screws as disclosed in the patent document 2, there is a problem that screw threads are fragile. Further, particularly in a case where a slender cylindrical fishing rod body is provided with screws, stress will concentrate on the part of screws, thus posing another problem. Although not disclosed in the patent document 2, there is a necessity for forming a step part in a tapered shape, with consideration given to prevention of the concentration of stress. Where an end part of the cylindrical fishing rod body is made a slanted condition, for example, reaming is provided. In this instance, a slender cylindrical fishing rod body made with a fiber-reinforced resin will easily develop cracks by processing pressure. Therefore, it is not preferable to give a direct treatment to a member made of a fiber-reinforced resin, in view of the manufacturing processes.

Patent document 1: Japanese Published Unexamined Patent Application No. 2001-37378

Patent document 2: Japanese Published Unexamined Patent Application No. 2002-233274

SUMMARY OF THE INVENTION

An object to be solved by the invention is prevention of boundary separation on substantial deflection where a super-elastic alloy is used as a core material.

Another object of the invention is to provide a high-quality tip rod for raft fishing which is slight in bending and stable in strength.

Further another object of the invention is to secure the strength of a joining part and also to inhibit and prevent deflection of a tip rod, where only a tip part region of the tip rod is made with a super-elastic alloy alone and subsequently joined with a tubular body made with a fiber-reinforced resin, thereby giving an entire tip rod.

In order to attain the above objects, the invention comprises the following structure.

(1) A tip rod comprising:

a core material made with a super-elastic alloy, an outside layer made with a fiber-reinforced resin provided outside of said core material, and a resin-rich layer greater in resin ratio than that of said outside layer which is provided between said outside layer and said core material in an adjacent manner.

The super-elastic alloy is an alloy having an elongation percentage exceeding 3%, for example, 5 to 8%, and available as an Ni—Ti alloy, Ni—Ti—Fe alloy, Ni—Ti—Cu alloy and Ni—Ti—Cr alloy.

Further, the tip rod of the invention is that the tip rod is a fishing rod itself in the case of an unjoined fishing rod.

Since a layer having a greater resin ratio is allowed to stand between the core material made with a super-elastic alloy and the outside layer, it is possible to prevent boundary separation not only by one-dimensional elongation in a deflecting direction but also by ease of two-dimensional (or three-dimensional) deformation of resins (deformation following property).

(2) The tip rod according to (1) wherein said resin-rich layer is 99% by weight or higher in resin ratio at a region adjacent to said core material.

A region, the resin ratio of which is 99% by weight or higher is a region substantially formed with a resin alone, thereby preventing boundary separation more effectively.

(3) The tip rod according to (2) wherein said resin-rich layer is adjacent to the region having said resin ratio exceeding 99% by weight, reinforced with a glass fiber woven textile, and having a layer of fiber-reinforced resin, which is greater in resin ratio than said outside layer.

Since the layer of fiber-reinforced resin, the resin ratio of which is greater than that of the outside layer is provided outside of the layer made with a resin alone, the resin of the layer made with a resin alone is absorbed into the outside layer during burning, thereby preventing a difficulty in forming the resin layer. Further, since the reinforced fiber of the layer of fiber-reinforced resin is a glass fiber, it is greater in elongation percentage and tenacious as a reinforced fiber, following more easily on substantial deflection, than other types of reinforced fibers.

(4) The tip rod according to (1) wherein the surface of said core material is made coarse in the range from 12.5 to 25 microns as Rmax based on JIS B 0659.

A coarse surface of the core material improves adhesiveness of the core material with the resin-rich layer, thereby making it difficult to separate the core material from the resin-rich layer on substantial deflection.

(5) The tip rod according to (1) wherein said outside layer is a woven textile used as a reinforced fiber.

Since the reinforced fiber of the outside layer is a woven textile, individual fibers will not become problematic with improved durability of the tip rod, when the tip rod is substantially deflected.

(6) The tip rod according to (1) wherein the reinforced fiber of said outside layer is a glass fiber.

Since the reinforced fiber of the outside layer is a glass fiber, the fiber is great in elongation percentage to easily withstand substantial deflection, when the tip rod is substantially deflected.

(7) The tip rod according to (1) wherein said outside layer consists of plural layers, each of which is 0.07 mm or lower in thickness.

Although formed with prepreg materials, the tip rod is a rod formed with those having a smaller thread size, because each layer is 0.07 mm or lower in thickness whereas as ordinary prepreg materials are about 0.1 mm in thickness. Therefore, it is possible to make smaller a step occurring between a wind-starting end and a wind-ending end, preventing an increased uneven thickness of the tip rod which should be originally small in diameter, also preventing the occurrence of deflection orientation, thereby providing a high quality tip rod.

(8) The tip rod according to (1) wherein said outside layer is provided at a region excluding a tip part region of said core material.

(9) The tip rod according to (1) wherein bubbles are abundantly dispersed at said fiber-reinforced resin region.

Bubbles are abundantly dispersed at the fiber-reinforced resin region and remain therein. To be more specific, a fact that bubbles abundantly remain in a shaped article means that a tip rod is manufactured by rendering smaller a tightening force by tightening means and conducting removal of bubbles in a less positive way, while bending of tip rod materials is prevented. The smaller tightening force allows the resin and bubbles to move to a lesser extent during heating and burning, making it difficult to disturb the orientation of reinforced fibers of a wound sheet, thus resulting in prevention of reduced strength of the tip rod. The tip rod of the invention has bubbles therein but is resistant to crush breakage, as with a solid fishing rod made with a reinforced fiber, because the core material is an alloy or made with a metal, and is also less influenced in strength by bubbles unlike a tubular fishing rod. In addition, the presence of bubbles makes it possible to mitigate the internal stress resulting from tip rod materials during heating and burning, thereby successfully preventing bending of the tip rod. As explained in the above, the tip rod of the invention is stable in strength and also less frequently bent. Further, since the core material is made with a super-elastic alloy and the outside layer made with a fiber-reinforced resin is provided through the resin-rich layer, boundary separation resulting from a difference in elongation between the core material and the outside layer can be prevented due to the presence of the resin-rich layer capable of giving a greater elongation, when the rod is substantially deflected, thereby providing the tip rod with more stable strength.

(10) The tip rod according to (9) wherein said bubbles are mostly in a shape longer in the longitudinal direction.

(11) The tip rod according to (9) wherein a core material region at which said resin-rich layer is provided is straight or 3/1000 or lower in taper ratio.

A core material made with a super-elastic alloy is rolled to provide a resin-rich layer outside of the core material or a sheet is wound around to provide an outside layer. Since the said region is straight or 3/1000 or lower in taper ratio, it is possible to prevent the turning of one longitudinal end of the core material to the other end inside the surface of a work bench during rolling. To be more specific, prepreg sheets can be wound around in a linear fashion, thus making it possible to prevent the occurrence of twisted sheets or others, realizing a uniform orientation of reinforced fibers, and providing a tip rod stable in rigid strength and high in quality.

(12) A manufacturing method for the tip rod includes a process wherein a polypropylene tape is tightened toward the outside of a longitudinal predetermined region of the core material made with a super-elastic alloy outside of the layer on which a prepreg sheet is tightened around in such a tensile force that tensile stress is rendered to be 64.7 $N/mm^2$ or lower and subjected to pressure and heating to give a shaped article.

Since the tightening tape is given a tensile force to such an extent that tensile stress is rendered to be 6.6 $kgf/mm^2$ (64.7 $N/mm^2$) or lower and made with polypropylene, it will not cause heat contraction. It is possible to make pressure smaller to the wound sheet due to the tightening tape to prevent bending of tip rod materials, as well as to keep bubbles instead of eliminating the bubbles remaining in materials, which, therefore, provides functions to mitigate the internal stress resulting from the tip rod materials during heating and burning due to the presence of such bubbles and results in prevention of bending of the tip rod during formation. Further, since the tightening pressure is in the above-mentioned range, the resin and bubbles will move to a lesser extent, making it possible to prevent disturbance of the orientation of reinforced fibers, thus attaining a stable strength of the tip rod. The tip rod has bubbles therein but is resistant to crush breakage, as with a solid fishing rod made with a reinforced fiber, because the core material is an alloy or made with a metal free of bubbles, and also less influenced in strength by bubbles unlike a tubular fishing rod.

(13) The manufacturing method according to (12) wherein on a longitudinal predetermined region of the core material made with a super-elastic alloy, a resin sheet and a prepreg sheet high in resin ratio are allowed to polymerize, the resin sheet is placed on the side adjacent to said core material made with a super-elastic alloy and then wound around, and a prepreg sheet of the body lower in resin ratio than that of said prepreg sheet high in resin ratio is wound around on the outside where these sheets are wound around.

In order to allow a annular region substantially made with a resin alone to remain adjacent to the core material, a high-resin ratio prepreg sheet higher in resin ratio than that of the prepreg sheet used in the body is allowed to polymerize with a resin sheet and wound around by making the resin sheet adjacent to the core material, thereby preventing separation occurring on boundaries between the core material and the prepreg sheet used in the body when the tip rod is substantially deflected.

(14) The tip rod comprises:

a solid member made with a super-elastic alloy and having male screws on the outer circumference, a tubular member made with a fiber-reinforced resin, and a metal cylindrical component adhered on the inner surface of said tubular member made with a fiber-reinforced resin and provided with female screws that can be joined with said male screws on the inner circumference, and said male screws are joined with said female screws.

Since a metal member is screwed together with another metal member to attain joining, a sufficient joining can be obtained even though the screwed part is short, thus making it possible to reduce the joined region to the least possible extent. Therefore, it is possible to keep deflection properties of the tip rod, namely, smoothness of a deflection curve.

(15) The tip rod according to (14) wherein the inner surface of the tubular member tip at the region to which said metal cylindrical component is adhered is straight or in a tapered shape free of any step or abrupt change in relation to the inner surface of the tubular member close to the rear side thereof.

Since a region to which the cylindrical component is adhered is straight or in a tapered shape free of any step or abrupt change, namely, it connects smoothly and continuously to the inner surface of the tubular member close to the rear side, it is possible to prevent the concentration of stress immediately after the region to which the metal cylindrical component is adhered when the rod is subjected to deflection-related deformation.

(16) The tip rod according to (14) wherein at least either of the outer circumferential surface of said cylindrical component or the inner surface of said tubular member to which the cylindrical component is allowed to be adhered is provided with a fine irregularity similar to that obtained on treatment with sandpaper (from No. 100 to No. 600).

Since either of the inner surface of the tubular member to which the cylindrical component is allowed to be adhered or the outer circumferential surface of the cylindrical component is provided with a fine irregularity, the adhesive force is improved.

(17) The tip rod according to (14) wherein the rear part of said metal cylindrical component reduces in wall thickness as it proceeds backward in such a way that the inner surface comes close to the outer circumferential surface.

Since the rear part wall thickness of the metal cylindrical component undergoes a gradual reduction, the concentration of stress resulting from the force which the tubular member receives from the rear end of said cylindrical component can be reduced when deflection is imparted.

(18) The front part of said metal cylindrical component according to (14) is formed at a tapered part on the slanted cylinder side in such a way that, as it proceed forward, the inner surface comes close to the outer circumferential surface, and a cylinder side tapered part is formed at a front side part more than male screw parts of said solid member in such a way that the outer diameter becomes greater, as it proceeds forward, in a taper ratio greater than that of the tapered part on said cylinder side.

The presence of the tapered part on the cylinder side makes it easy to introduce the rear part of the solid member into the cylindrical component. Further, since the front side part can be gradually larger in diameter than the part of the male screws of the solid member, the tip rod can be rendered to be difficult in breakage. In addition, since the cylinder side tapered part is formed in taper ratio greater than that of the tapered part on the cylinder side, the surface of the cylinder side tapered part comes in contact with the tip part of the tapered part on the cylinder side, tightens gradually, thereby preventing loose screws, when screwed together.

DETAILED DESCRIPTION OF THE PREFERRED EMBODIMENTS

The invention will be described in detail with reference to the drawings.

First Embodiment

Figure 1:
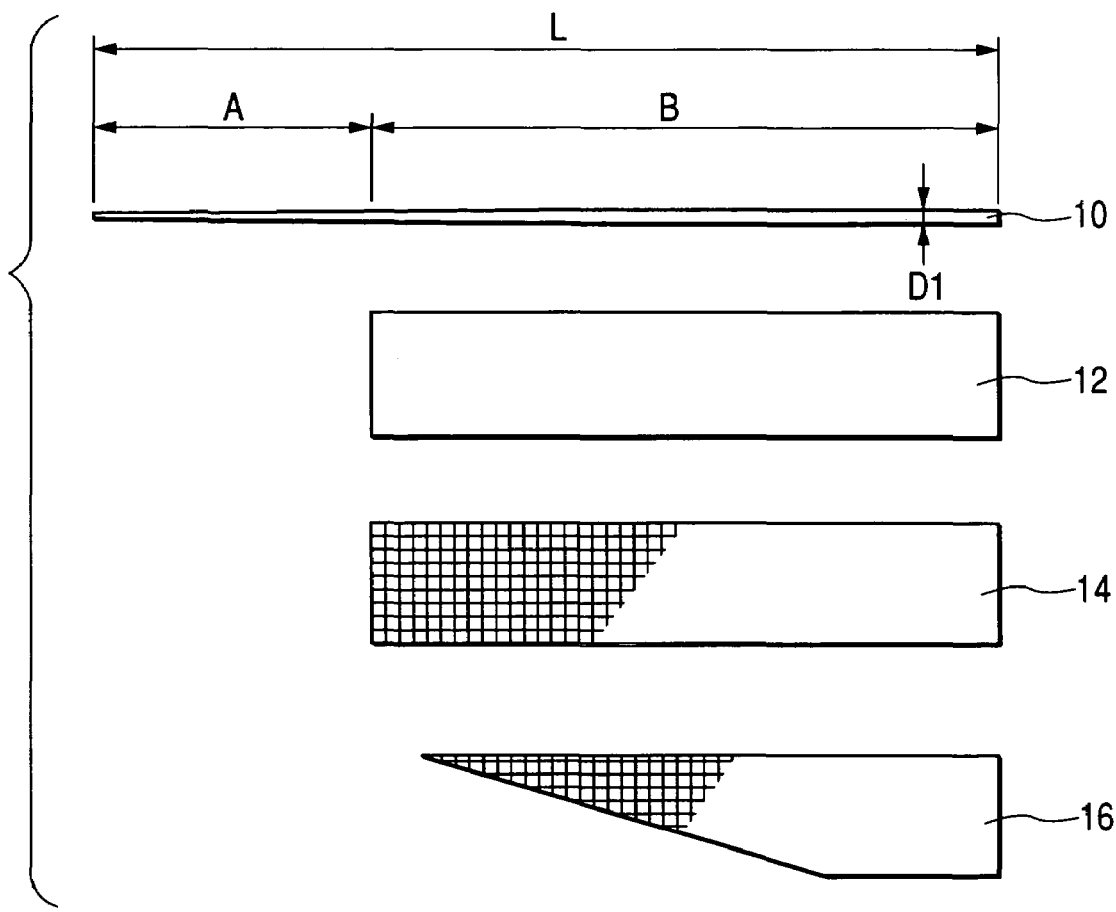
FIG. 1 is a drawing explaining a manufacturing method of a tip rod according to a first embodiment of the present invention.

FIG. 1 is a drawing explaining a method for manufacturing the tip rod according to a first embodiment of the invention. Of previously-explained examples of super-elastic alloys, in this embodiment, the solid core material 10 made with an Ni—Ti alloy is 530 mm in length L, and the tip part region A is in a tapered shape, with the diameter at the tip end about 0.3 mm. In general, the diameter is preferably in a range from 0.2 to 0.3 mm to provide delicateness. The rest of the rear part region B is straight and about 1.1 mm in diameter D1. The rectangular resin sheet 12 along almost the entire length of the rear part region B and the similar-sized prepreg sheet 14 made with a glass fiber woven textile are super imposed and wound up together. The resin used in this resin sheet is epoxy resin, as with that used in the sheet 14 or the sheet 16 to be explained later. The resin sheet 12 is 13 microns in thickness and the prepreg sheet 14 is about 17 microns, and will be wound around, with 1.7 ply used as the design value, so that they will not exceed 2 ply. In this embodiment, the glass fiber is oriented in two directions, namely, the longitudinal direction and circumferential direction for the core material. The glass fiber may also be oriented toward the direction covering ±45 degrees. Since it is difficult to wind up the resin sheet 12 alone in relation to the core material, the prepreg sheet 14 is allowed to polymerize thereon. The prepreg sheet 14 is 26% by weight in resin ratio.

The prepreg sheet 16 that is an illustrated trapezoidal glass fiber woven-textile covering the area somewhat at a rear position than the front end position of the resin sheet 12 (about 10 mm rear position) to the rear end of the core material is wound around the polymerization sheet. This prepreg sheet is 32% by weight in resin ratio and about 60 microns in thickness, and wound around 12 times in this embodiment. The polypropylene tightening tape not illustrated here is tightened on the material made with a fiber-reinforced resin provided on the thus prepared core material in tensile force, tensile stress of which is 6.6 kgf/mm$^2$(64.7 N/mm$^2$) or lower, namely, tensile force of which is 5.3 kgf/mm$^2$(51.9 N/mm$^2$) in this embodiment. To be more specific, this is a tape which is 25 microns in thickness, 6 mm in width, and 0.8 kgf (7.8 N) in tensile force. Thereafter, the tape is heated to burn the tip rod. Consequently, the tip rod is manufactured, with the rear end part diameter D2 about 2.5 mm. As explained so far, a lower pressure kept by the tightening member makes it possible to retain the resin layer by the resin sheet adjacent to the core material.

Figure 3:
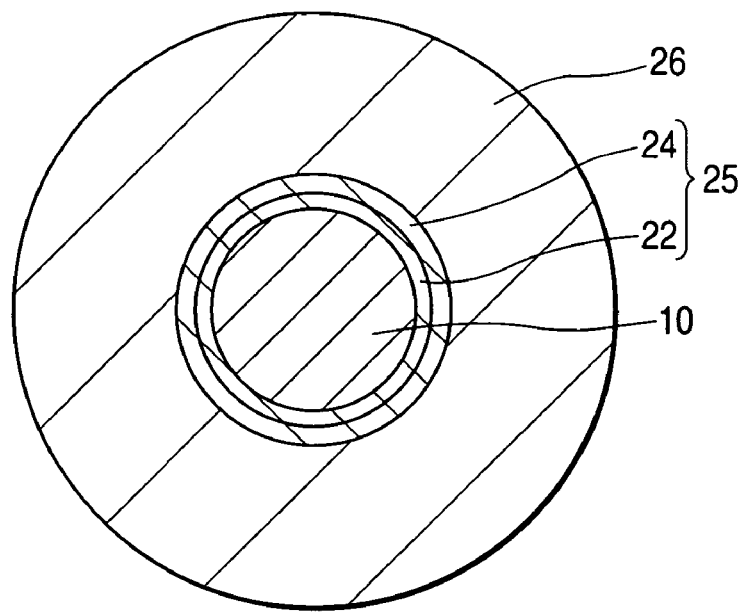
FIG. 3 is an enlarged pattern-like transverse cross sectional view of the tip rod, when viewed from the arrow line C-C in FIG. 2.

FIG. 3 shows a transverse cross section of the tip rod covering an enlarged transverse cross section in the vicinity of a longitudinal central part of the region B of the core material. The annular region 22 made with epoxy resin alone is formed adjacent to the outside of the core material 10, a fiber-reinforced resin annular region 24 is formed adjacent to the annular region 22, and an outside layer 26 is formed adjacent to the fiber-reinforced resin annular region 24. The annular region 22 and the fiber-reinforced resin annular region 24 are formed by winding the resin sheet 12 and the prepreg sheet which are polymerized. The annular region 22 is formed by epoxy resin that is oozed from the wound resin sheet 12 and prepreg sheet 14. The fiber-reinforced annular region 24 is formed by the remaining resin sheet 12 and prepreg sheet 14. The outside layer 26 is formed by winding the prepreg sheet 16 around the fiber-reinforced resin annular region 24. A combined region of the annular region 22 made with resin alone with the annular region 24 constitutes the resin-rich layer 25 in this embodiment, and the resin-rich layer 25 in this embodiment is 47% by weight in mean resin ratio. The resin-rich layer may be constituted only with the layer 22 made with resin alone or only with the layer of fiber-reinforced resin high in resin ratio and similar to the region 24. In brief, it is necessary to provide a resin-rich layer (preferably made with resin alone) at a range from 15 to 70 microns (preferably from 25 to 60 microns) in a fashion adjacent to the core material 10. The above-described resin-rich layer 25 is about 50 microns in thickness as the mean thickness of an entire circumference.

On the basis of a difference in characteristics such as a difference in elongation percentage between the core material 10 and the outside layer 26 or a difference in quality of materials, for example, the core material is uniform in quality because of a metal but the outside layer is not uniform because of a fiber-reinforced resin, change in gap resulting from substantial bend-related deformation is filled and followed by utilizing the elasticity of the intervening resin-rich layer 25 in order to prevent boundary separation occurring between the surface of the core material and the inner circumferential surface of the outside layer on substantial deflection. In addition, for the purpose of improving adhesiveness of this resin-rich layer with the core material 10, the surface of the core material is manually polished by using Scotch Brite Disk A-VF (Sumitomo 3M), thereby obtaining the irregularity in a range from 12.5 to 25 microns as Rmax based on JIS B 0659. Such treatment makes it possible to improve adhesiveness of the core material with the resin-rich layer, thereby preventing boundary separation occurring between the outside layer 26 and the core material, and providing an increased durability as the tip rod, by the intervention of the resin-rich layer.

The above-explained super-elastic alloy core material is a solid material. As a modified embodiment, a tubular part is also acceptable that is solid at the tip part region with which a fiber-reinforced resin is not provided at least outside, having a hole which is opened to the rear end at the rear area.

Second Embodiment

Figure 2:
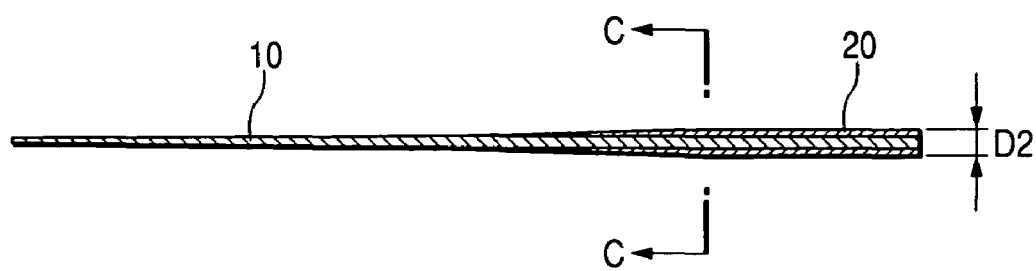
FIG. 2 is a longitudinal sectional view of the tip rod manufactured according to the method shown in FIG. 1.
Figure 4:
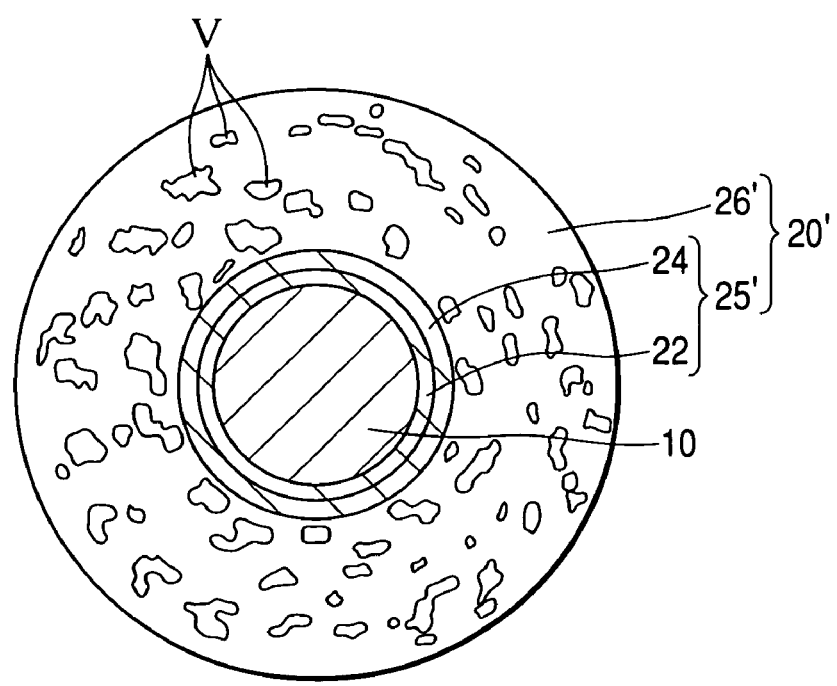
FIG. 4 is an enlarged transverse cross sectional view of the tip rod, when viewed from the arrow line C-C in FIG. 2 according to a second embodiment of the invention.

Next, an explanation will be made for a second embodiment of the invention. This embodiment is different from the first embodiment in constitution of an additionally reinforced resin region (layer). Since remaining constitution are the same as the first embodiment, the same symbols are given and the explanation will be omitted. FIG. 4 is an enlarged transverse cross sectional view of the tip rod, when viewed from the arrow line C-C in FIG. 2 according to a second embodiment.

Observation of the cross section reveals a plurality of bubbles V on the outside layer 26' formed by the prepreg sheet 16, as shown in FIG. 4. In this instance, the bubbles are found only on the layer 26' in the body but they could be produced on the resin-rich layer 25' as well, although small in number. In other words, the bubbles could be dispersed in the fiber-reinforced resin region (layer) 20' which combines the resin-rich layer 25' and the outside layer 26'. The bubbles are mostly found in size proportional to that illustrated in the transverse cross sectional view, and when converted into a circle having the same area, they are about 30 to 200 microns in diameter. Further, the bubbles V are mostly elongated along a longitudinal direction of the rod, which is related to tip rod materials hung longitudinally during burning in manufacturing the tip rod.

Since many bubbles V are found in dispersion, the internal stress is mitigated during the heating and burning, by which deflection of tip rod materials can be prevented. Further, on the basis of a difference in characteristics such as a difference in elongation percentage between the core material 10 and the outside layer 26' or a difference in quality of materials, for example, the core material is uniform in quality because of a metal but the outside layer is not uniform because of a fiber-reinforced resin, change in gap resulting from substantial deflection-related deformation is filled and followed by utilizing the elasticity of the intervening resin-rich layer 25' in order to prevent boundary separation occurring between the surface of the core material and the inner circumferential surface of the outside layer on substantial deflection. Therefore, the tip rod is provided with an increased durability. Since the core material is solid and made with a metal, the tip rod is not subjected to crush breakage due to the presence of bubbles, and consequently bubbles affect the quality of the tip rod less frequently.

The above explained super-elastic alloy core material is a solid material. As a modified embodiment, a tubular part is also acceptable that is solid at the tip part region with which a fiber-reinforced resin is not provided at least outside, having a hole which is opened to the rear end at the rear area.

Third Embodiment

Figure 5:
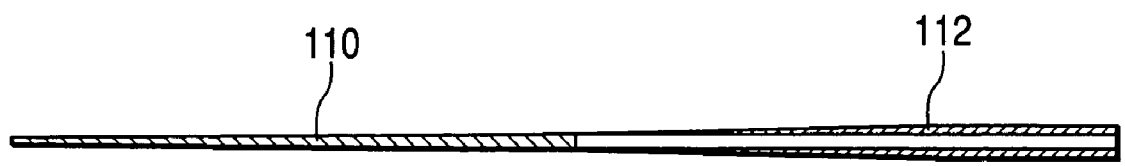
FIG. 5 is a longitudinal sectional view of the tip rod according to a third embodiment of the invention.
Figure 6:
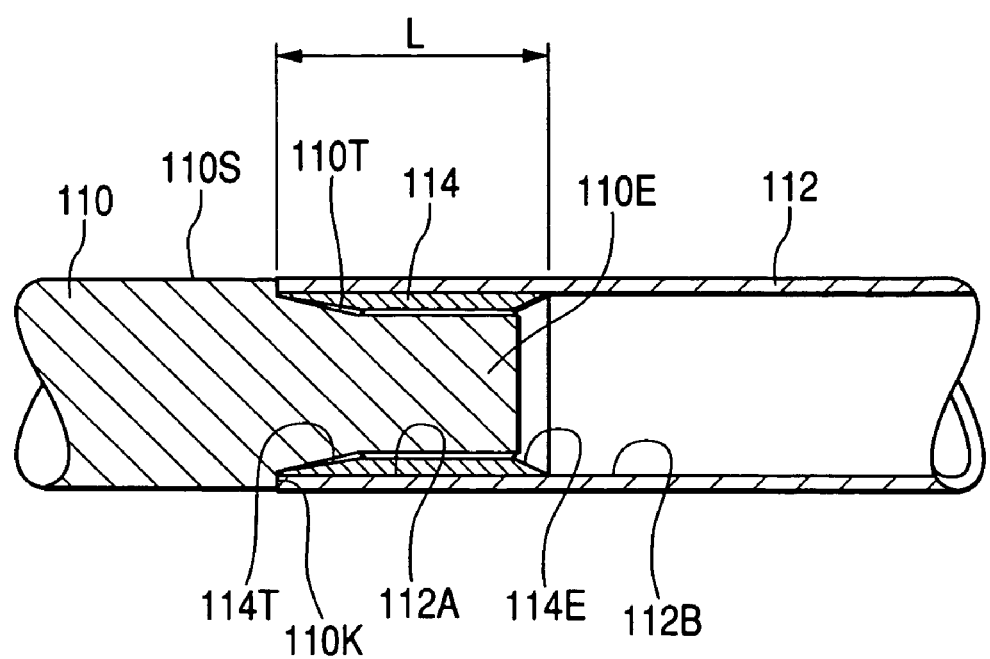
FIG. 6 is an enlarged view of the joining part of the tip rod and the vicinity explained in FIG. 5.

FIG. 5 is a longitudinal sectional view of the tip rod according to a third embodiment of the invention. About half of the front side of the tip rod is the solid member 110 made with an Ni—Ti alloy of the previously-described super-elastic alloys, having a matrix as synthetic resins such as epoxy resin at the rear end part and joining with the tubular member 112 made with a fiber-reinforced resin strengthened with reinforced fibers such as carbon fibers and glass fibers. FIG. 6 is an enlarged view of the joining part of the tip rod and the vicinity. The cylindrical component 114 made with a metal such as stainless steel or brass is pressure-fitted and adhered to the inner surface 112A at the front end part of the tubular member 112, and female screws are provided on the inner surface of the cylindrical part. The outer circumferential surface of this cylindrical part is formed in a fine irregularity polished with sandpaper (No. 100 to No. 600), and the inner surface at the front end part of the tubular member to be engaged therewith is also formed in a similar fashion, giving a coarse surface (irregular state) as compared with the inner surface at the rear area, thus resulting in an increased joining strength with an adhesive agent.

On the other hand, the rear end part 110E of the solid member 110 is made smaller in diameter than the front part 110S, and male screws to be engaged with the female screws are provided on the outer circumference. The rear end part 114E of the cylindrical component 114 is formed in a tapered shape and becomes gradually thin in wall thickness in such a way that the inner circumferential surface comes close to the outer circumferential surface. Therefore, the concentration of stress which the tubular member 112 receives from the rear end part of the cylindrical component 114 can be mitigated when the tip rod is bent. Further, the front end part inner surface 112A of the tubular member 112 is formed straight or in a tapered shape free of any step or abrupt change in relation to the inner surface of the tubular member 112B close to the rear. In other words, the surface to which the inner surface 112B is extended almost as it is constitutes the front end part inner surface 112A. Therefore, since the front part region of the tubular member joined with the cylindrical component 114 is in a dimensional configuration which will not cause change in wall thickness in the tubular member itself, the concentration of stress is prevented near the rear end of the cylindrical component.

The front end part of the cylindrical component 114 is formed at the slanted cylinder side tapered part 114T in such a way that, as it proceeds forward, the inner surface comes close to the outer circumferential surface, and acts as an introduction guide for the inserting operation of allowing the rear end part of the solid member 110 to be screwed together. Further, the tapered part on the solid member 110T is formed on the front region of male screw parts of the rear end part of the solid member in such a way that the outer diameter becomes greater, as it proceeds forward, in taper ratio greater than that of the tapered part on the cylinder side, ending on the step-like end surface 110K. As explained so far, when the tapered part of the solid member side is formed in a taper ratio greater than that of the tapered part on the cylinder side, the tip end part of the tapered part on the cylinder side (tip end part of the cylindrical component) is kept pressed in relation to the surface of the tapered part on the solid member side 110T, resulting in a difficulty in loosening joining parts, and therefore preventing squeaks at the joining parts.

The joining can be effected by using screws alone, but it is also possible to provide a structure which cannot be separated by a purchaser if the joining is effected during the manufacture in combination with an adhesive. However, when the joining is effected by using screws alone, it is possible to change a solid member with another solid member, which is different in bend characteristics due to a difference in length or type of raw materials, for example. In this instance, when a turning operation is carried out with the solid member 110 held, it is desirable to provide a slip-resistant part by giving a fine irregularity or others to the outer circumferential surface 110S at the front side region immediately before the region to be joined. The slip resistant part is sufficient in width corresponding to that of two fingers in an axial direction of the rod, for example, about 30 mm.

As explained above, since a metal member is screwed together with another metal member to attain joining, it is possible to make short the joining part length L for obtaining a joining strength, particularly the part of the screws. The joining part length L needed in the invention is about 5 to 10 mm for a tip rod with the maximum outer diameter 4 mm or lower (4 mm or lower in the maximum outer diameter at the rear part of the tubular member 112). Thus, a deflection curve found when the tip rod is deflected is smooth, giving a smaller influence to the joining parts.

Fourth Embodiment

Figure 7:
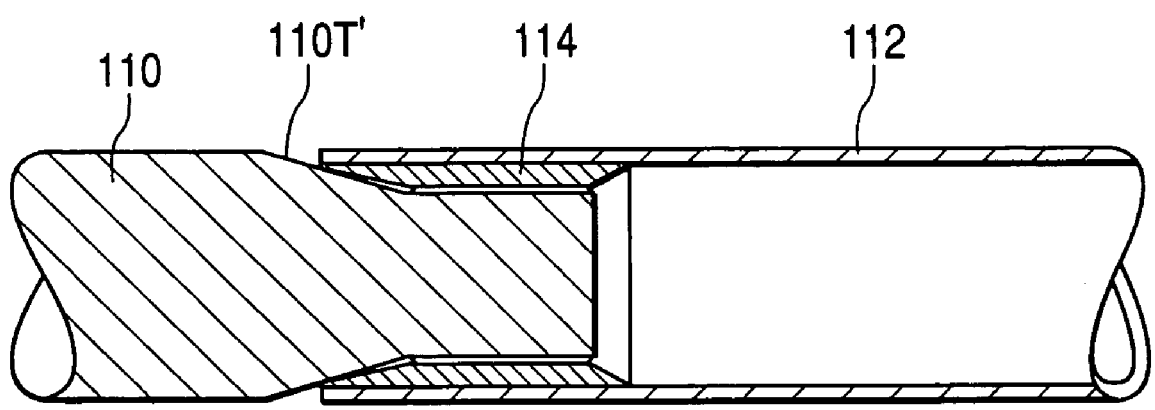
FIG. 7 is a drawing of the joining part of the tip rod and the vicinity according to a fourth embodiment of the invention.

FIG. 7 is a drawing of the joining part of the tip rod and the vicinity according to a fourth embodiment of the invention, and different from the first embodiment in that the solid member 110 is free of the step-like end surface 110K and the tapered part of the solid member side 110T' extends to the surface of the solid member. Although there is a difference in whether a step is found or not in the vicinity of the joining part, other actions and effects are similar.

This invention is applicable to a fishing rod used in raft fishing or to a tip rod to be used in catching filefish.

What is claimed is:

1. A tip rod comprising
   a core material made with a super-elastic alloy;
   a resin-rich layer disposed on the core material; and
   an outside layer comprising a fiber-reinforced resin, and disposed on the resin-rich layer,
   wherein the resin-rich layer has a resin ratio which is greater than that of the outside layer.

2. The tip rod according to claim 1 wherein the resin-rich layer comprises a first region that is 99% by weight or more in resin and is disposed on the core material.

3. The tip rod according to claim 2 wherein the resin-rich layer further comprises a layer of fiber-reinforced resin which is disposed on the first region, and comprises a glass fiber woven textile and a ratio greater than that of the outside layer.

4. The tip rod according to claim I wherein the surface of the core material has a roughness in the range from 12.5 to 25 microns as measured by Rmax based on JIS B 0659 standard.

5. The tip rod according to claim 1 wherein the outside layer comprises is a woven textile as the fiber reinforcement.

6. The tip rod according to claim 1 wherein the outside layer comprises a glass fiber as the fiber reinforcement.

7. The tip rod according to claim 1 wherein the outside layer comprises plural layers, wherein each of the layers is 0.07 mm or lower and greater than 0.0 mm in thickness.

8. The tip rod according to claim 1 wherein the core material comprises a tip part and a rear part, and the outside layer is not provided at the tip part of the core material.

9. The tip rod according to claim 1 wherein bubbles are abundantly dispersed in the outer layer.

10. The tip rod according to claim 9 wherein the bubbles are formed in a longitudinal direction along a length of said core material.

11. The tip rod according to claim 1 wherein the core material comprises a first region on which the resin-rich layer is disposed wherein the first, region is straight or 3/1000 or lower in taper ratio.

12. The tip rod according to claim 1, wherein the core material is of a solid configuration.

* * * * *